United States Patent [19]

Hyman

[11] 4,191,169

[45] Mar. 4, 1980

[54] SOLAR ENERGY PANEL

[75] Inventor: Mark Hyman, Waltham, Mass.

[73] Assignee: Solar Heat Corporation, Arlington, Mass.

[21] Appl. No.: 875,161

[22] Filed: Feb. 6, 1978

[51] Int. Cl.$^2$ ............................................. F24J 3/02
[52] U.S. Cl. .................................. 126/444; 126/447
[58] Field of Search .............. 126/270, 271; 237/1 A

[56] References Cited

U.S. PATENT DOCUMENTS

| | | | |
|---|---|---|---|
| 2,918,709 | 12/1959 | Corcoran | 126/270 X |
| 3,076,450 | 2/1963 | Gough et al. | 126/271 |
| 3,145,707 | 8/1964 | Thomason | 126/271 |
| 3,908,631 | 9/1975 | Rom | 126/270 |
| 4,030,478 | 6/1977 | Beaver | 126/270 X |
| 4,036,209 | 7/1977 | Press | 126/271 |
| 4,038,967 | 8/1977 | Stout et al. | 126/271 |
| 4,058,111 | 11/1977 | Wendel | 126/271 |
| 4,084,574 | 4/1978 | Golay | 126/270 |
| 4,084,579 | 4/1978 | Yu | 126/270 X |
| 4,084,580 | 4/1978 | Roark | 126/270 X |

Primary Examiner—Samuel Scott
Assistant Examiner—Randall L. Green
Attorney, Agent, or Firm—Wolf, Greenfield & Sacks

[57] ABSTRACT

A light-weight, low-cost and high efficiency solar panel includes a light-weight rectangular wood frame which surrounds and houses a copper absorber plate. A pair of spaced glazings, formed from plastic film materials, are disposed above the absorber to define a pair of enclosed air spaces. The lower glazing is capable of withstanding high temperatures and the upper glazing material is capable of providing good weather resistance. The material of the upper glazing extends fully about the frame to protect the entire frame from weathering. Insulation is provided beneath the absorber plate. The frame rests on top of a bottom sheet of insulative foam plastic which is wrapped in a plastic envelope. The surrounding film of the outer glazing is bonded securely to the envelope to encase the entire panel within a protective sealed envelope of weather-resistant plastic film.

13 Claims, 4 Drawing Figures

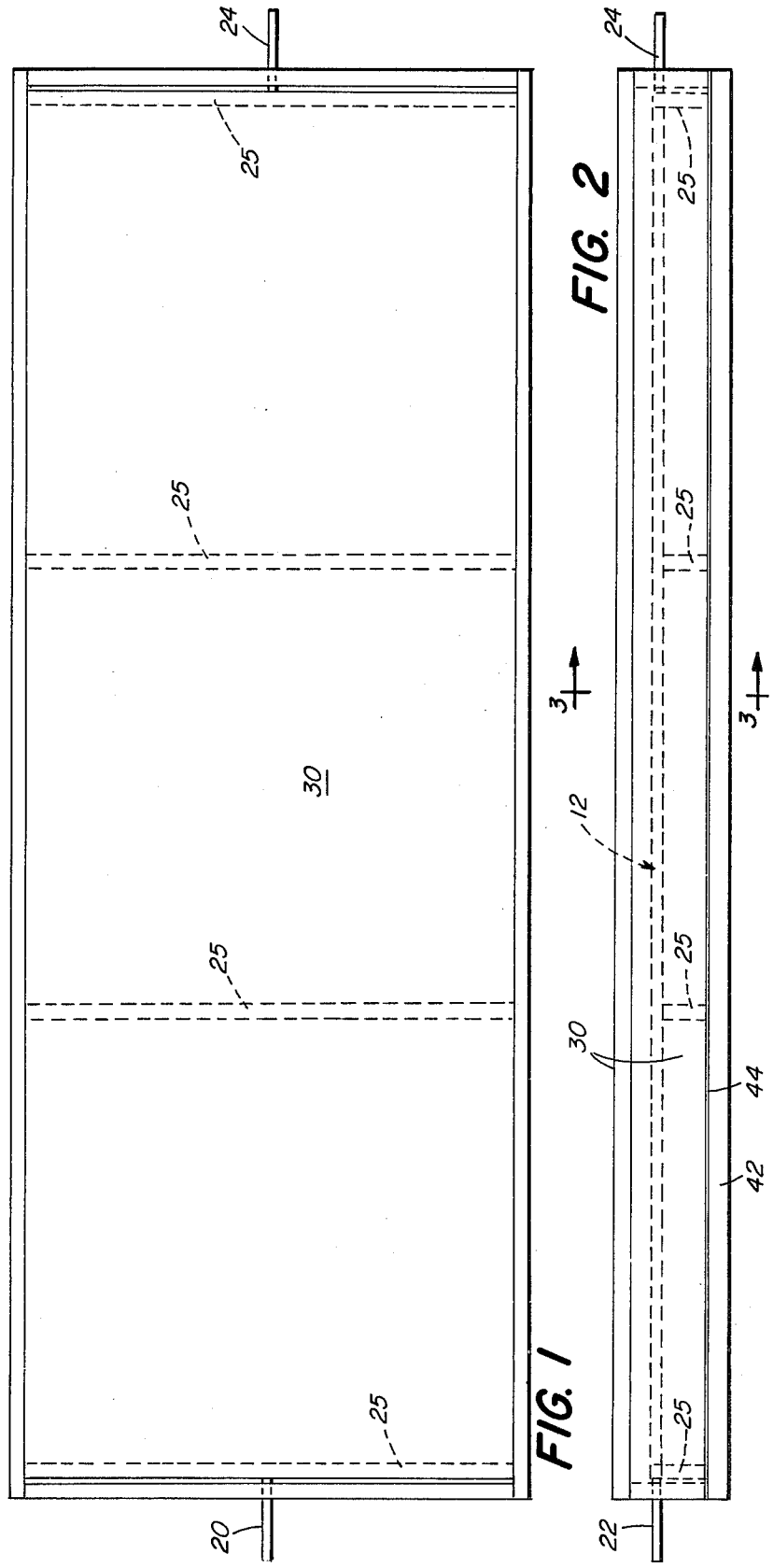
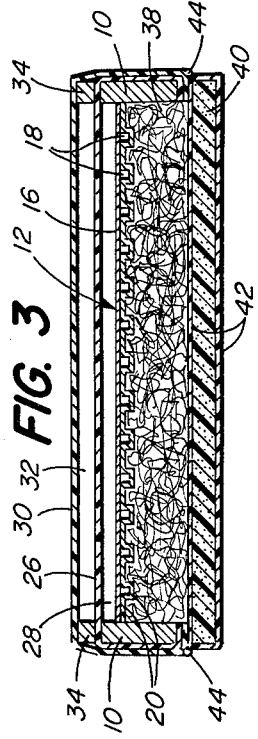
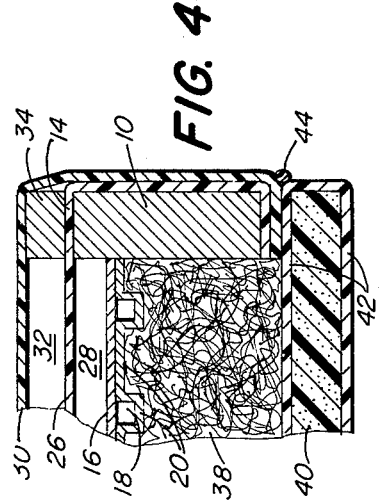

SOLAR ENERGY PANEL

BACKGROUND AND SUMMARY OF THE INVENTION

This invention relates to improvements in solar energy panels of the type adapted to be mounted on a roof or the like to absorb solar energy and convert it to heat which is conducted to a fluid medium such as water and then utilized in the heating system for the building or for the storage of hot water for any desired purpose.

In recent years, the rapidly increasing costs of energy derived from fossil fuels have resulted in numerous proposals for the use of alternate energy sources, such as solar energy. There have been numerous suggested constructions for solar energy collectors which may be mounted on the roof of a house to provide energy for domestic hot water or space heating. While some of the prior collectors have met with limited success, one of the primary obstacles still presented to the use of roof mounted solar energy collectors is that they are relatively expensive, not only in their manufacture but also in their transportation, handling and installation. The roof mounted collectors are exposed to the elements at all times which heretofore has required the use of expensive materials and construction. Moreover, the thermal efficiency of most leaves much to be desired. The combined effect of these difficulties is that solar collector installations generally require a very substantial initial financial committment and require a long period of time in order to begin to recapture the initial investment. Typically, prior efforts to develop low cost solar collectors are believed to have resulted in units having relatively poor efficiency.

In brief, the present invention includes a rectangular frame which defines the panel. An absorber plate having water tubes, is secured in the frame with its blackened, energy-absorbing surface facing upward. Water inlet and outlet means are provided to communicate the tubes with the water circulation system. Secured to the frame, and extending above the absorber plate are a pair of spaced glazings, including an inner glazing and an outer glazing. Both glazings are formed from transparent plastic films, as will be described. The inner glazing is secured to the frame to define an air space between the copper absorber plate and the inner glazing. The inner glazing is formed from a plastic film material which is not adversely affected by the high temperatures which may develop within the air space, as a result of what is sometimes characterized as the "greenhouse effect". The outermost film is heat shrinkable and is shrunk to draw it tightly over the frame, above the first glazing, to define a second air space. The outer glazing is a tough plastic skin and can withstand adverse weather conditions such as hail, snow loads and the like. The outer glazing surrounds the frame to encase it entirely. Insulation is provided within the frame beneath the absorber plate. The doubly glazed frame rests on a lower sheet of insulative material which itself is enveloped in a sheet of plastic film. The juncture of the outer glazing and the envelope about the bottom insulative sheet is continuously bonded by adhesive to completely encase the collector within a tough, protective plastic film.

It is among the general objects of the invention to provide an improved solar collector panel which is of low cost and light-weight construction.

Another object of the invention is to provide a solar collector panel in which the entire panel is encased in a protective sheet of plastic material.

A further object of the invention is to provide a double glazed solar energy collector which displays improved efficiency in that it allows more of the sun's energy to reach the absorber plate than with prior double glazed systems.

DESCRIPTION OF THE DRAWINGS

The foregoing and other objects and advantages of the invention will be appreciated more fully from the following further description thereof, with reference to the accompanying drawings wherein:

FIG. 1 is a plan view of the solar collector;

FIG. 2 is a side elevation of the collector shown in FIG. 1;

FIG. 3 is a sectional view of the collector as seen along the line 3—3 of FIG. 2; and FIG. 4 is an enlarged illustration of an end portion of the device as seen in FIG. 3.

DESCRIPTION OF THE PREFERRED EMBODIMENT

As shown in the drawings, the collector panel is generally rectangular and, for example, may be of the order of 3 feet wide, 8 feet long and 5 inches thick. A plurality of such panels may be mounted to the roof of a building so as to most efficiently face the sun. Each of the panels is provided with water inlet and outlet conduits by which water may be circulated through the panels. In a typical installation, a plurality of such panels will be secured to the roof and connected into the fluid system.

The panel includes a rectangular main frame 10, preferably is formed from a wood such as Douglas Fir which has good dimensional stability. The wood preferably is painted with an epoxy paint before the unit is assembled to render it impermeable to moisture. A solar energy absorber plate, indicated generally at 12, is mounted to the main frame 10 at a location below the upper edge 14 of the main frame. The absorber plate is formed from copper and may include a flat absorber sheet 16 and a plurality of tubes secured in heat conductive relation to the sheet 16. The tubes 18 may be defined by a preformed second copper sheet 20 welded or soldered to the absorber sheet. The upwardly facing surface of the absorber sheet 16 is coated with a black, absorptive film. Absorber sheets of this type may be obtained commercially, for example, from the Kennecott Copper Corporation, (Ledgemont Laboratory, Lexington, Mass.) designated as their "Terra-Lite" absorber plate. The panel is provided with an inlet conduit 22 and an outlet conduit 24 which are in communication with the water tubes 18. The inlet and outlet pipes 22, 24 are connected to the water tubes by manifolds. The pipes 22, 24 may be connected in the heating system as desired. Wooden cross braces 25 may extend transversely between the sides of the main frame to provide intermittent supports for the absorber plate.

The panel includes an inner glazing 26 which is disposed above the absorber plate 12 to define a first, lower air space 28. An outer glazing 30 is attached to the frame above the inner glazing 26 to define a second, upper air space 32. Both glazings 26, 30 are formed from plastic film material having a high degree of transparency to solar energy. The intermediate air spaces 28, 32 define insulative spaces to minimize thermal losses through the glazings.

The inner glazing 26 is formed from a film of fluorinated ethylene-propylene resin which is available commercially from E. I. duPont de Nemours Co. of Wilmington, Delaware, under the trade designation Teflon FEP-Fluorocarbon Film. The inner glazing sheet is of the order of 1 mil thick and provides very good transmission to solar energy, of the order of 96%. The refractive index of the material is very low as is its reflectivity which is of the order of 2% at each surface. This has found to be an improvement over prior double glazing systems which use glass, which typically has reflectivity of the order of 4% at each surface resulting in a transmission of only approximately 92%. The inner glazing film is drawn about the main frame 10 and may be wrapped about the lower edge of the main frame 10 as suggested in the drawings. The inner glazing material may be secured to the main frame by staples or the like.

In addition to the excellent optical transmission properties, the material of the inner glazing sheet film displays a high degree of stability under the high temperatures which often are developed within such solar panels. For example, the fluorinated ethylene-propylene resin is capable of withstanding temperatures of up to 550° F. without becoming embrittled or otherwise deteriorating. This temperature resistance is well in excess of the temperatures which ordinarily may be expected to be developed within the first air space 28. It may be noted that the material for the inner glazing does not necessarily have to display superior weather resistant qualities, as the panel is protected from the weather by the outer glazing 30, described below.

The outer glazing 30 also is formed from a film of plastic material which is spaced above the inner glazing sheet 26. To this end, the panel includes a secondary rectangular frame 34 which is of the same plan dimensions of the main frame 10 but which is of a substantially reduced height. The secondary frame 34 is supported by the upper edge of the main frame 10, with the inner glazing 26 being sandwiched between the main and secondary frames 10, 34. The secondary frame 34 serves to space the inner and outer glazings to define the upper space 32. The outer glazing 30 is wrapped over the secondary frame 34, downwardly about the sides of the main frame 10 and then beneath the lower edge of the main frame 10 as shown more clearly in FIG. 4.

The outer glazing 30 is formed from a film of tough plastic material which is heat shrinkable and heat is applied during the manufacturing procedure to shrink the film tightly over the frame. The material from which the outer glazing is formed is a polyvinylfluoride film which is commercially available from E. I. duPont de Nemours Co. under the trade designation "Tedlar". The Tedlar film preferably is 4 mils thick. It has good transmission characteristics which are similar to (in some cases, superior to) glass, being of the order of 92% transmission. When the Tedlar film is shrunk, it becomes tight and is capable of withstanding adverse weather conditions such as hail, snow loads and the like. Unlike the prior art devices which have employed double glazing systems, the weight of the plastic film inner and outer glazings is negligible.

The temperature-resistant inner film 26 and weather resistant outer film 30 cooperate to protect each other. In this regard, it should be noted that the outer glazing 30 does not have the high resistance to temperature as the inner glazing material 26. Thus, the temperature-resistant inner glazing 26 serves to protect the outer glazing 30 from the heat generated as a result of the "greenhouse effect". The outer glazing 30, which is very tough and weather resistant, protects the inner glazing 26 from the elements. Typically, the temperature of the air in the upper air space 32 will be considerably lower than that in the lower air space 28, which is bounded partly by the copper absorber plate. For example, the outer glazing film ordinarily will be capable of withstanding temperatures up to the order of approximately 170° F., which may be very close to if not somewhat less than the temperatures which may be developed within the lower air space.

The bottom of the collector panel is provided with thermal insulation. Within the main frame 10, below the collector plate 12, the region is filled with the fiberglass insulative material, preferably having an insulation value of R11. By way of example, the thickness of the insulation may be of the order of 3 inches although this will depend on the nature of the particular insulative material. The bottom of the collector panel is insulated further by a bottom insulative sheet 40 which, preferably, is a rigid foamed polystyrene resin having good insulative properties, preferably of the order of insulation value of R5. The sheet 40 of foam polystyrene is wrapped in an envelope of plastic material, which preferably may be formed from the same material as the outer glazing 30, indicated at 42 to protect the polystyrene sheet 40 as well as to provide further protection for the entire collector panel. The bottom sheet 40 covers the entire bottom of the collector panel and is secured to the collector panel by nails. A bead of silicone rubber cement 44 is applied at the juncture of the envelope 42 of the bottom sheet 40 and the outer glazing film 30. This serves further to secure the sheet 40 to the collector panel as well as to seal the entire panel within a substantially continuous plastic envelope which precludes migration of moisture and otherwise serves to protect the entire collector panel from the elements.

From the foregoing, it will be appreciated that the entire panel is formed from relatively lightweight materials. The use of heavy glass and supporting structures for glass is omitted. As a result, a panel measuring 3 feet by 8 feet in plan weighs approximately 45 pounds, as compared to prior and commercially available collectors of similar size which weigh up to approximately 150 pounds. The light weight of the present collector enables it to be placed readily on existing buildings and facilitates its adaption to new building designs. Moreover, the double glazing system provides a high degree of transmission to the solar radiation and results in significant improvements in efficiency of operation.

It should be understood that the foregoing description of the invention is intended merely to be illustrative thereof, and that other embodiments and modifications may be apparent to those skilled in the art.

Having thus described the invention, what I desire to claim and secure by Letters Patent is:

1. A solar energy panel comprising:
    a frame;
    an absorber plate mounted to the frame, the absorber plate including means defining flow passages for a fluid medium and for communicating said fluid medium to and from the fluid passages;
    a first glazing attached to and extending across the frame, above and in spaced relation to the absorber plate, said first glazing comprising a film of plastic material which is substantially transparent to solar energy;

a second glazing attached to the frame and extending over the first glazing in spaced relation to the first glazing, said second glazing being formed from a film of plastic material which is substantially transparent to solar energy, said second glazing extending downwardly along the outside surfaces of the frame in surrounding relation to the frame; and a bottom film of plastic material covering the bottom of said panel and being integral and continuous with the second glazing to encase the entire panel within protective plastic material.

2. A solar energy panel as defined in claim 1 further comprising:

said second glazing material extending downwardly about the outside surfaces of the frame to the bottom of the frame;

a bottom insulation panel being formed from plastic insulative material and extending across the bottom of the frame in spaced relation to the underside of the absorber plate; and the marginal portion of the second glazing being bonded to the bottom insulative sheet fully along the juncture of the first glazing and the insulative sheet.

3. A solar energy panel as defined in claim 2 further comprising:

said bottom insulation panel being formed from a foamed plastic material and being covered by an envelope of plastic film impermeable to moisture, said envelope being bonded to the marginal portions of the first glazing.

4. A solar energy panel as defined in claim 2 wherein the region between the underside of the absorber plate and the bottom insulation panel is substantially filled with insulative material.

5. A solar energy panel as defined in claim 1 further comprising:

said second glazing being formed from a heat shrinkable plastic film and being shunk on the frame.

6. A solar energy panel as defined in claim 1 wherein said second glazing is formed from a film of polyvinylfluoride material.

7. A solar energy panel as defined in claim 6 wherein the first glazing comprises a film of fluorinated ehtylene-propylene resin having a transmission to solar energy of the order of 96%, said second glazing having solar energy transmission charcteristics of the order of 92%.

8. A solar energy panel as defined in claim 1 further comprising:

said absorber plate being secured to the main frame at a location below the upper edge of the main frame, the first glazing being stretched about the upper edge of the main frame;

said frame including a secondary rectangular frame resting on top of the main frame and sandwiching the first glazing therebetween;

the second glazing being stretched about the upper edge of the secondary frame, thereby defining insulative spaces between the absorber plate and the first glazing and between the first glazing and the second glazing.

9. A solar energy panel as defined in claim 6 wherein said first glazing is of the order of 1 mil thick and wherein the second glazing is of the order of 4 mils thick.

10. A solar energy panel as defined in claim 1 further comprising:

cross bracing means connected to the opposite sides of the frame below the absorber plate to provide support for the absorber plate.

11. A solar energy panel as defined in claim 1 wherein said frame is formed from wood.

12. A solar energy panel as defined in claim 11 wherein said wood frame is painted with a coat of epoxy resin.

13. A solar energy panel as defined in claim 1 wherein said film of plastic material of said first glazing has a higher temperature resistance and lower weather resistance than the material of said second glazing film.

* * * * *